United States Patent
Gotz

(10) Patent No.: US 8,952,964 B2
(45) Date of Patent: Feb. 10, 2015

(54) GENERATING ANIMATED VORONOI TREEMAPS TO VISUALIZE DYNAMIC HIERARCHICAL DATA WITH NODE INSERTION

(75) Inventor: David Haim Gotz, Purdys, NY (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/834,583

(22) Filed: Jul. 12, 2010

(65) Prior Publication Data

US 2011/0292050 A1 Dec. 1, 2011

Related U.S. Application Data

(60) Provisional application No. 61/349,330, filed on May 28, 2010.

(51) Int. Cl.
| | |
|---|---|
| G06T 11/20 | (2006.01) |
| G06T 17/20 | (2006.01) |
| G06T 13/00 | (2011.01) |
| G06T 17/00 | (2006.01) |

(52) U.S. Cl.
CPC ................ *G06T 17/20* (2013.01); *G06T 13/00* (2013.01); *G06T 17/005* (2013.01); *G06T 11/206* (2013.01)
USPC ....................................................... 345/440

(58) Field of Classification Search
CPC .............................. G06T 17/005; G06T 17/20
USPC .......................................... 345/423, 440–443
See application file for complete search history.

(56) References Cited

U.S. PATENT DOCUMENTS

| 6,169,817 | B1 | 1/2001 | Parker et al. |
| 6,332,030 | B1 | 12/2001 | Manjunath et al. |
| 7,071,952 | B1 * | 7/2006 | Ternulf et al. ................. 345/629 |
| 7,472,084 | B2 | 12/2008 | Damschroder |
| 7,932,904 | B2 * | 4/2011 | Branets et al. ................ 345/423 |
| 2008/0263080 | A1 | 10/2008 | Fukima et al. |
| 2010/0302279 | A1 * | 12/2010 | Sud et al. ...................... 345/660 |

OTHER PUBLICATIONS

Balzer et al., Voronoi Treemaps for the Visualization of Software Metrics, SoftVis '05 Proceedings of the 2005 ACM Symposium on Software Visualization, 2005, pp. 165-172.*

Pang et al., Development of a Process-Based Model for Dynamic Interaction in Spatio-Temporal GIS, GeoInformatica 6:4, 2002, pp. 323-344.*

(Continued)

*Primary Examiner* — Charles Tseng
(74) *Attorney, Agent, or Firm* — Ryan, Mason & Lewis, LLP

(57) ABSTRACT

Methods and apparatus are disclosed for generating animated treemaps, such as Voronoi treemaps, with node insertion to visualize dynamic hierarchical data. A treemap is processed by obtaining a multi-level tessellation having a plurality of existing regions; and inserting at least one new region into the multi-level tessellation by adjusting one or more of a size and location of at least one of the existing regions. In this manner, a stability of the treemap is preserved. The insertion selects a vertex of the multi-level tessellation as an insertion point. The selected vertex can be selected randomly from a set of vertices that define regions that are siblings to the newly inserted region; or can be a known location. A weight can be assigned to a new Voronoi generator, such as a nominal weight according to one or more constraints of the tessellation.

20 Claims, 12 Drawing Sheets

(56) References Cited

OTHER PUBLICATIONS

Tu et al., Visualizing Changes of Hierarchical Data using Treemaps, IEEE Transactions on Visualization and Computer Graphics, vol. 13, No. 6, Nov./Dec. 2007, pp. 1286-1293.*

Karavelas et al., Dynamic Additively Weighted Voronoi Diagrams in 2D, Algorithms—ESA 2002, Lecture Notes in Computer Science 2461, Sep. 2002, pp. 586-598.*

Horn et al., Visualizing Biodiversity with Voronoi Treemaps, Sixth International Symposium on Voronoi Diagrams, Jun. 2009, pp. 265-270.*

Otjacques et al., "CGD—A New Algorithm to Optimize Space Occupation in Ellimaps", Dialog/Ei Compendex; 2009.

Andrews et al., "The InfoSky Visual Explorer: Exploiting Hierarchical Structure and Document Similarities", Inspec/Palgrave McMillan; vol. 1, No. 3-4; pp. 166-181, Dec. 2002.

Denier et al., "Understanding the Use of Inheritance with Visual Patterns"; ACM Digital Library/IEEE; pp. 79-89; 2009.

* cited by examiner

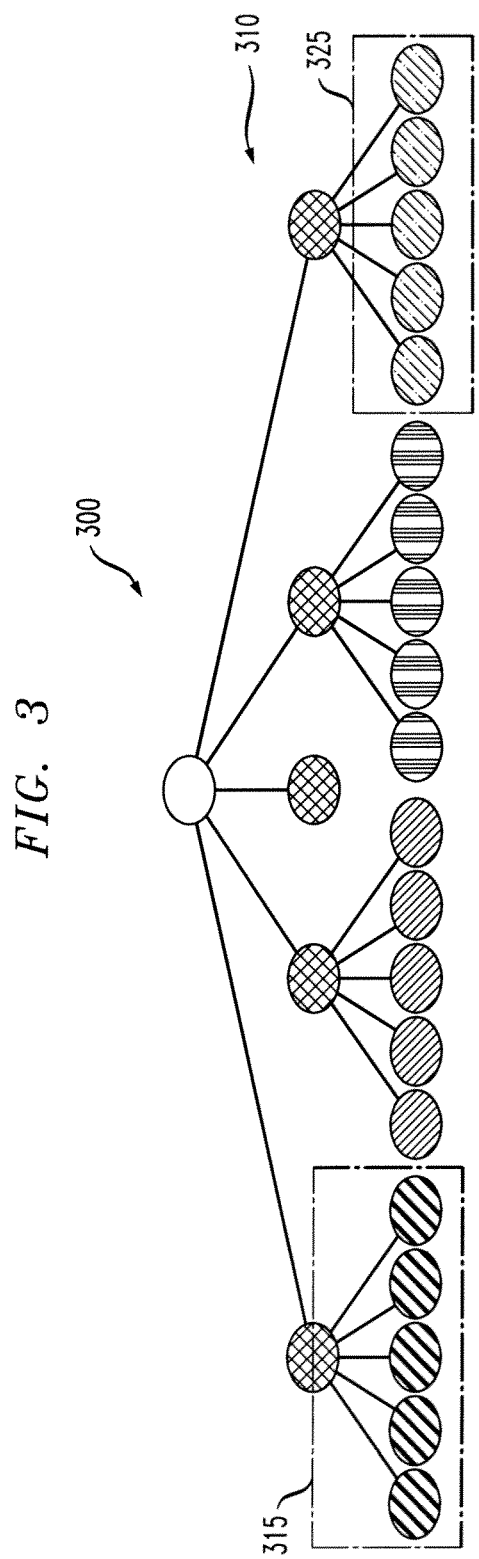

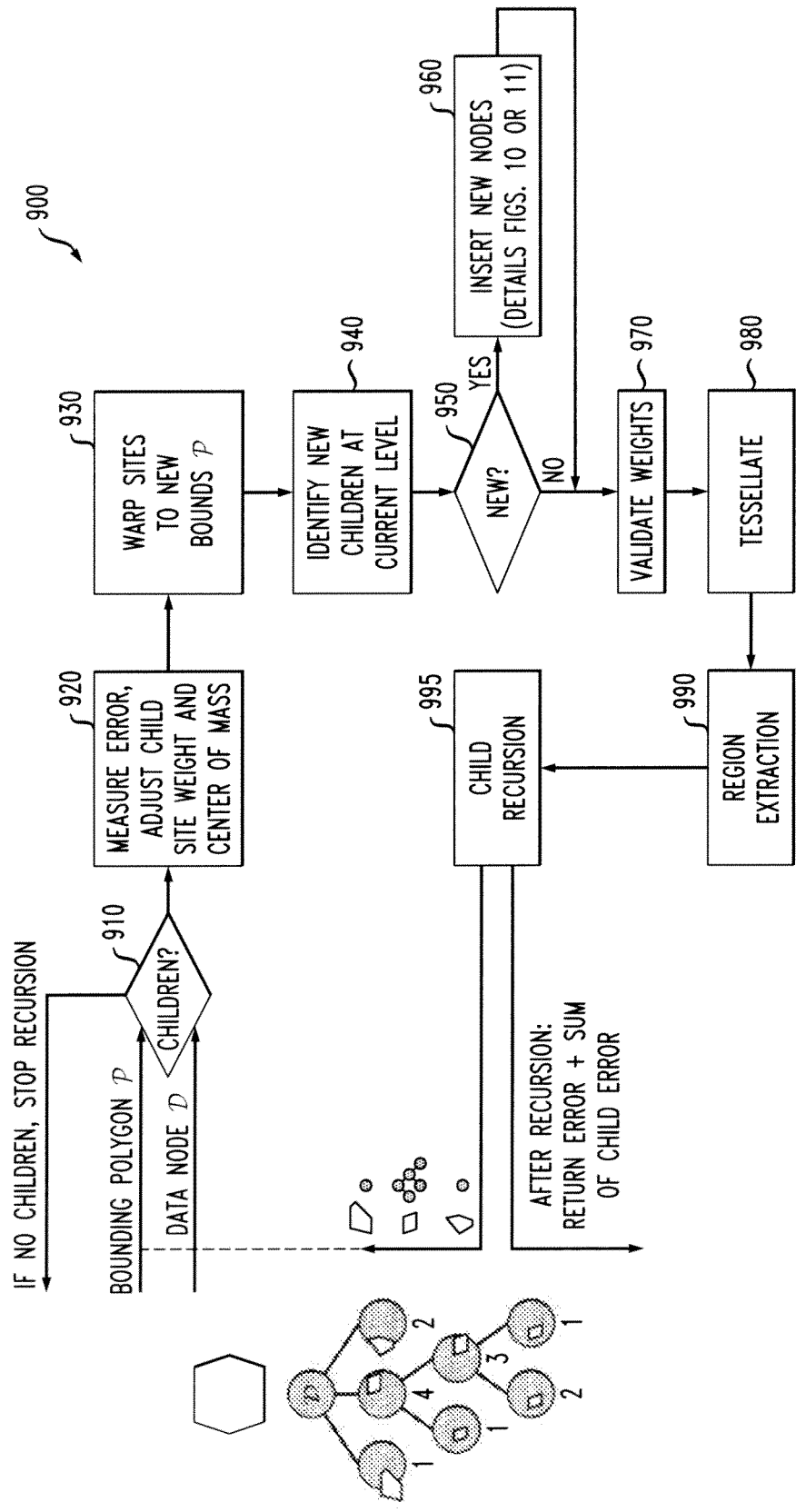

GENERATING ANIMATED VORONOI TREEMAPS TO VISUALIZE DYNAMIC HIERARCHICAL DATA WITH NODE INSERTION

CROSS-REFERENCE TO RELATED APPLICATIONS

The present application claims priority to U.S. Provisional Application Ser. No. 61/349,330, filed May 28, 2010, incorporated by reference herein.

STATEMENT OF GOVERNMENT RIGHTS

This invention was made with Government support under Contract No. H98230-08-C-1295, awarded by the National Security Agency (NSA). The Government has certain rights in this invention.

FIELD OF THE INVENTION

The present invention relates generally to visualization techniques for hierarchical data and, more particularly, to methods and apparatus for generating animated Voronoi Treemaps to visualize dynamic hierarchical data.

BACKGROUND OF THE INVENTION

Hierarchical data structures are a widely used data abstraction for the organization and classification of information. Hierarchies have been utilized in a vast array of applications, including corporate organizational charts, computer file systems and the stock market. Given the ubiquitous nature of these data structures, hierarchical visualization techniques have received attention within the Information Visualization community.

One method for visualizing hierarchical data is the Treemap. See, for example, B. Johnson and B. Shneiderman, "Tree-Maps: A Space-Filling Approach to the Visualization of Hierarchical Information Structures," Proc of IEEE Visualization (1991). Generally, the Treemap is a space-tilling visualization technique. A recursive spatial sub-division algorithm is used to create an arrangement of nested rectangles. The size of each rectangle encodes the value of an attribute of the data set (e.g., the size of a file or directory when visualizing a file system) while the nested rectangles represent children (e.g., files and sub-directories contained within a directory).

A number of techniques have been proposed or suggested to make Treemaps a more effective visualization technique. For example, a number of proposed techniques have attempted to reduce the often high aspect ratios of rectangular regions produced by the original algorithm. However, these improvements to aspect ratio typically come at the cost of increased instability. None of these algorithms offer both full stability and ideal aspect ratios. As a result, Treemap applications have largely been applied to relatively static data sets where the sizes of cells do not change significantly over time.

The resulting instability that afflicts most Treemap layout algorithms manifests itself during animation as potentially large discontinuous jumps in the position and dimensions of individual cells. These jumps, most problematic for algorithms that produce the best aspect ratios, are highly disruptive to users. As a result, several techniques have been developed to allow improved temporal animations of Treemap visualizations.

Voronoi Treemaps have been proposed for visualizing software structures. See, e.g., M. Balzer and O. Deussen, "Voronoi Treemaps," IEEE InfoVis, 7 (Washington, D.C., 2005); or M. Balzer et al., "Voronoi Treemaps for the Visualization of Software Structures," Proc. of ACM Symposium on Software Visualization (2005), each incorporated by reference herein. Generally, Voronoi Treemaps use an optimization-based layout algorithm to create Treemaps composed of nested convex polygonal shapes. The resulting regions typically have excellent aspect ratios. However, existing Voronoi Treemap algorithms do not produce layouts suitable for animation.

The inventor has recognized that a need still exists for a Treemap layout having both stability during animation and desirable aspect ratios. A further need exists for a Treemap layout that enables smooth continuous animation between states when presented with dynamic data.

SUMMARY OF THE INVENTION

Generally, methods and apparatus are provided for generating animated treemaps, such as Voronoi treemaps, with node insertion to visualize dynamic hierarchical data. According to one aspect of the invention, a treemap is processed by obtaining a multi-level tessellation having a plurality of existing regions; and inserting at least one new region into the multi-level tessellation by adjusting one or more of a size and location of at least one of the existing regions. In this manner, a stability of the treemap is preserved.

The insertion selects a vertex of the multi-level tessellation as an insertion point. A new generator can be placed at the insertion point. In one variation, the selected vertex is selected randomly from a set of vertices that define regions that are siblings to the newly inserted region. In another variation, the selected vertex is a known location. The known location can be initialized using a function over a set vertices that define regions that represent a set of siblings in a hierarchical data structure. The known location can be used, for example, for subsequent insertions until the known location vertex is invalidated. A weight can be assigned to a new Voronoi generator, such as a nominal weight according to one or more constraints of the tessellation.

A more complete understanding of the present invention, as well as further features and advantages of the present invention, will be obtained by reference to the following detailed description and drawings.

BRIEF DESCRIPTION OF THE DRAWINGS

FIG. 3 illustrates an exemplary hierarchical data set;

FIG. 9 is a flow chart describing an exemplary alternate implementation of a DVT algorithm having an insertion of one or more nodes;

DETAILED DESCRIPTION OF PREFERRED EMBODIMENTS

The present invention provides methods and apparatus for generating animated Voronoi Treemaps to visualize dynamic hierarchical data. According to one aspect of the invention, a Treemap layout algorithm is disclosed that provides both layout stability and desirable aspect ratios. The exemplary disclosed DVT algorithm uses an iterative optimization-based layout procedure and exploits the added layout flexibility made possible by using non-rectangular regions. As a result, the disclosed Dynamic Voronoi Treemaps (DVTs) enable smooth continuous animation between states when presented with dynamic data. Among other features, the disclosed DVTs do not introduce holes or require overlapping regions during the animation sequence. In contrast, the disclosed DVTs maintain a complete space-filling tessellation of the display space throughout all animated transitions. Generally, a tessellation of a plane is a collection of plane figures (e.g., regions) that fills the plane with substantially no overlaps and substantially no gaps.

One aspect of the invention interleaves the Voronoi tessellation calculations for all levels of the data hierarchy so that a single step in the optimization process is performed for each level before moving to the next optimization step. Thus, intermediate stages of the optimization are meaningful and can be graphically rendered. The interleaving process introduces new complications which are addressed by adding a new "warping" stage before each tessellation. Thus, according to a further aspect of the invention, the warping step produces a complete multi-level Voronoi tessellation for each iterative improvement to the layout. This is made possible by re-ordering the Voronoi computations and introducing the warping stage into the layout algorithm. The result is a Treemap layout that (1) is stable, (2) has regions that have very low aspect ratios, and (3) supports smooth animation where regions are easy to follow over time.

Another aspect of the invention provides two alternative techniques for inserting new regions into a dynamic Voronoi treemap visualization. Generally each technique allows for the smooth animated introduction of a new region into an existing dynamic Voronoi treemap visualization. The two disclosed exemplary insertion techniques differ in the selection of the insertion point in order to optimize different parameters of the visualization. One disclosed technique aims to make the appearance of new regions as transparent as possible to human users of the visualization. The second disclosed technique aims to minimize visualization instability introduced with the new regions so that the visualization converges to a stable solution as quickly as possible.

Figure 1C:
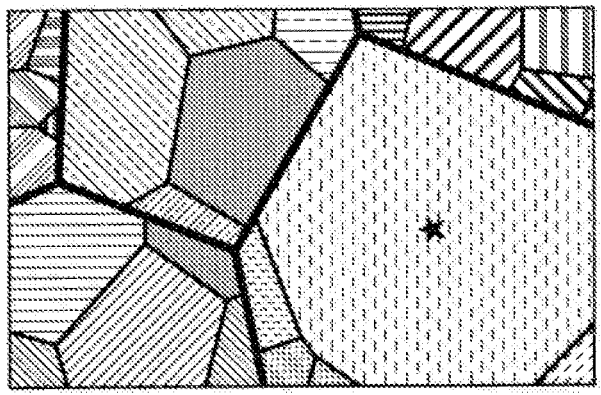
FIGS. 1A through 1C illustrate an exemplary Dynamic Voronoi Treemap (DVT) sequence illustrating job resource utilization within a parallel computer system.
Figure 1B:
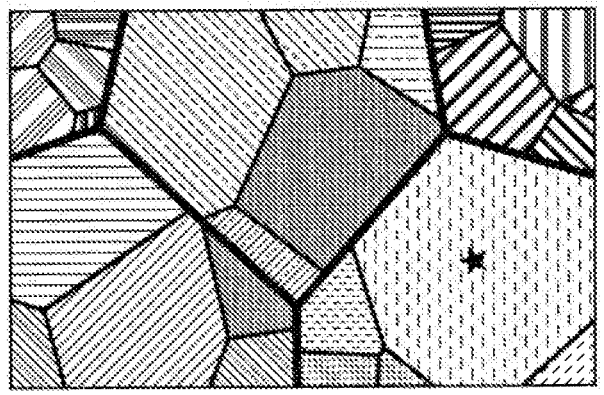
Figure 1A:
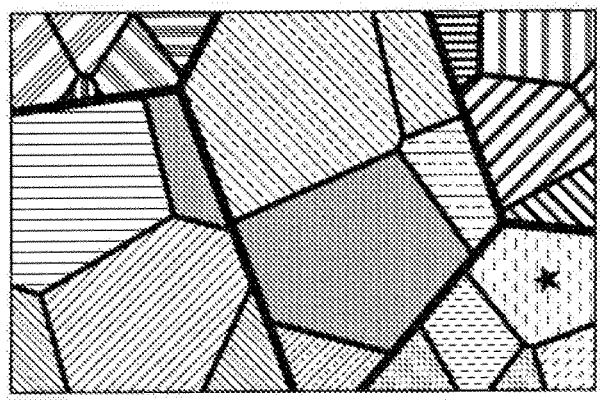

FIGS. 1A through 1C illustrate an exemplary DVT sequence. The exemplary DVT sequence illustrates job resource utilization within a massively parallel high-performance computer system. Cell size indicates the fraction of system resources allocated to a given job. Jobs are clustered by uniquely hashed dispatch queues, with a hash pattern intensity reflecting a key job performance metric. As shown in FIG. 1A, the job marked with a star is initially using only a moderate amount of resources. As shown in FIG. 1B, the job grows over time to become the most resource intensive on the system. By the end of the sequence, shown in FIG. 1C, the starred job has grown so large that its dispatch queue is using more than its share of system resources. As discussed herein, the DVT's ability to smoothly animate this behavior in accordance with the present invention allows a system technician to better understand the system's resource dynamics and diagnose problems.

Voronoi Treemaps

The traditional Voronoi Treemap (VT) algorithm differs significantly from its predecessors. The VT algorithm produces non-rectangular spatial subdivisions that exhibit high quality aspect ratios that are close to one. However, the VT algorithm suffers from certain properties that make it unsuitable for animating the display of changing data values.

Voronoi Treemap Algorithm Primer

VI's are composed of nested planar Voronoi tessellations. This section provides a brief overview of several key Voronoi tessellation concepts and present a high-level summary of the VT algorithm. For a more detailed discussion of the VT algorithm, see, for example, M. Balzer and O. Deussen, "Voronoi Treemaps," IEEE InfoVis, 7 (Washington, D.C., 2005).

1. Voronoi Tessellations

A Voronoi tessellation (also called a Voronoi diagram) is a partitioning of space into regions based on distances to a set of objects within the space. These objects are often called generators. Planar Voronoi tessellations are considered in the exemplary implementation, which partition a 2D plane. In addition, generators that are 2D points are employed in the exemplary implementation.

A. Planar Voronoi Tessellations.

A planar Voronoi tessellation using a set of n generators $G:=\{g_1, \ldots, g_n\}$ produces a corresponding set of n regions $R:=\{r_1, \ldots, r_n\}$ such that (a) each region $r_i$ contains exactly one generator $g_i$ and (b) every point within a region $r_i$ is closer to $g_i$ than to any other generator in set G. Voronoi tessellations may be unbounded (a partition of the entire $\Re^2$ plane) or bounded (a partition of a region B defined within the plane $\Re^2$).

Figure 2:
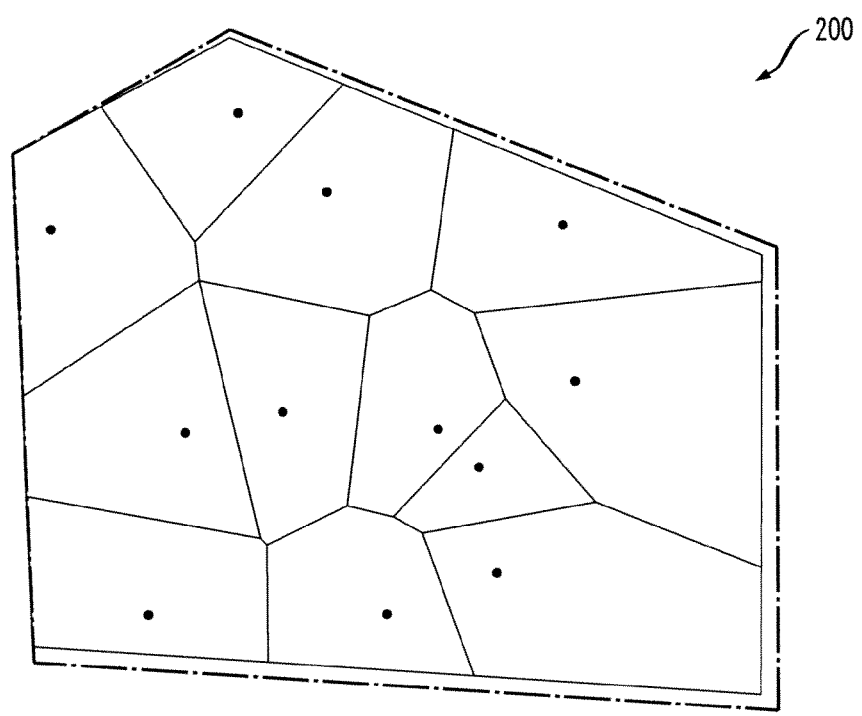
FIG. 2 illustrates bounded planar Voronoi tessellations.

FIG. 2 illustrates bounded planar Voronoi tessellations 200. The bounding region B is bounded by a series of dashed lines. The inner polygons are the Voronoi regions $\Re^2$, each containing a single generator $g_i$.

Traditional Voronoi tessellations are calculated using a Euclidean distance metric. As a result, each generator is treated with equal weight, and region boundaries cross exactly midway between generators. This is captured by the following Euclidean metric where $g_i$ is a generator and p is a point in $\Re^2$:

$$\text{distance}_e(g_i, p) := \|gi - p\| = \sqrt{(x_{gi} - x_p)^2 + (y_{gi} - y_p)^2} \quad (1)$$

B. Weighted Voronoi Tessellations.

Alternative distance metrics can be used when generating a Voronoi tessellation to influence the relative sizes of each region. Using a weighted metric, region boundaries will typically not cross midway between sites. Instead, boundaries will be closer to low-weight generators and further from high-weight generators. This property is important for Voronoi-based Treemaps where each region's size must be scaled based on the data value that it represents.

In the exemplary embodiment, an additively weighted power (AWP) distance metric is employed, as shown in Equation 2, which produces polygonal regions much like the classic Euclidean metric, Given a set of generators G, a corresponding set of weights is defined as follows W:={$w_1, \ldots, w_n$}. These weights are used within the AWP distance metric as follows:

$$\text{distance}_{awp}(g_i, w_i, p) := \|gi-p\|^2 - w_i \quad (2)$$

C. Centroidal Voronoi Tessellations

Centroidal Voronoi tessellations (CVTs) are a special type of tessellation where the generator $g_i$ for each region $r_i$ is located at the center of mass of the region. See, e.g., Q. Du et al., "Centroidal Voronoi Tessellations: Applications and Algorithms," SIAM Review, 41 (4):637-676 (1999). Such tessellations are relevant because they exhibit desirable aspect ratio properties. It is this property that has led to applications of CVTs within the visualization community. The iterative Lloyd's method (S. P. Lloyd, "Least Square Quantization in PCM," IEEE Transactions on Information Theory, vol. 28, 129-37 (1982)) can be used to obtain a CVT for a set of generators G. The calculation begins with an initial set of generators G and the corresponding Voronoi regions $\Re$. On each iteration, the center of mass $c_i$ for each region $r_i$ is calculated and the generator $g_i$ is moved to the position of $c_i$. The Voronoi tessellation is then recalculated. The iterative process continues until the distance by which each generator $g_i$ is moved is below an error threshold.

2. Voronoi Treemap Algorithm

The VT visualization technique uses a recursive layout algorithm similar to that of traditional rectangle-based Treemap techniques. The top level is fully subdivided first. This is followed by recursive subdivisions as the corresponding data structure is traversed. However, in place of the normal procedural subdivision algorithm, VTs utilize a variant of Lloyd's algorithm to produce a CVT.

FIG. 3 illustrates an exemplary hierarchical data set 300. The VT algorithm performs a series of sequential tessellations as it recursively calculates its overall layout. In the data hierarchy of FIG. 3, five tessellations are required as indicated by the distinct hash patterns. The top level tessellation (for the nodes 310) must iteratively converge prior to computing the Voronoi tessellation for the nodes 315. A complete tessellation is not available until the nodes 325 are reached.

Figure 4B:
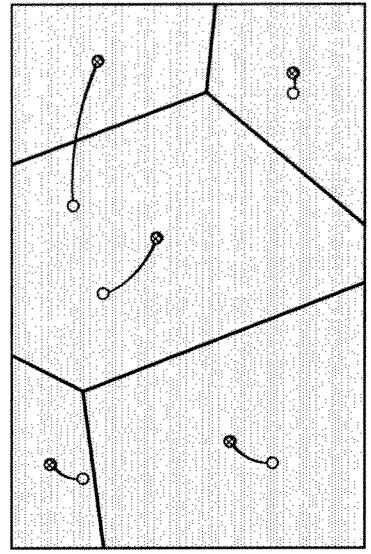
FIGS. 4A-4D illustrate a Voronoi treemap for the data set of FIG. 3.
Figure 4D:
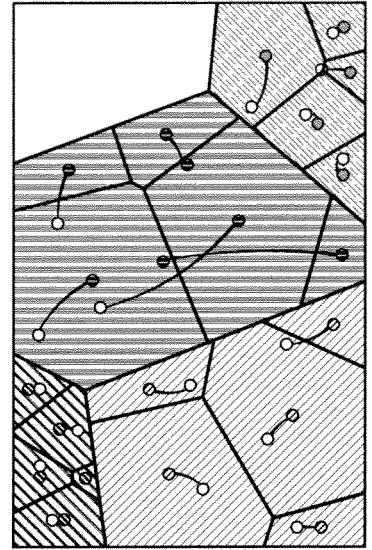
Figure 4A:
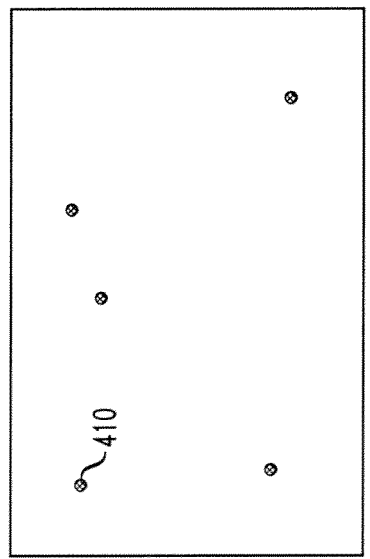

FIGS. 4A through 4D illustrate the construction of the corresponding VT visualization. Beginning with the initial bounding region, a set of generators is selected such that there is one generator for each of the root data element's children in the data hierarchy. For example, FIG. 4A shows one generator, such as generator 410, for each node 310 in FIG. 3. Each generator is assigned an initial weight that reflects the value of the generator's corresponding data element.

In the next stage, an iterative optimization algorithm computes a weighted CVT (FIG. 4B). The process uses Lloyd's algorithm where generator positions are moved to a region's center of mass after each iteration. This produces a Voronoi tessellation with desirable aspect ratios. At the same time, the weight for each generator is adjusted on each iteration so that region sizes converge to an area that reflects the data value associated with the generator.

Figure 4C:
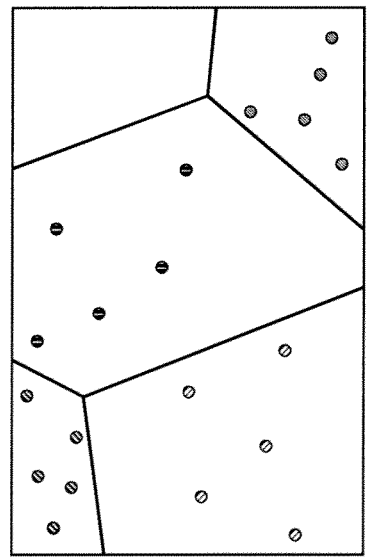

Once the iterative tessellation algorithm has converged to the desired weighted CVT, the process recourses to subdivide child regions. Within each region, generators are selected and assigned weights (FIG. 4C). These generators are then used to produce the next level of tessellations (FIG. 4D). The process continues until the full data hierarchy is reflected within the VT visualization.

Complications for Dynamic Data

The original VT technique works well for static data and has several desirable properties. However, the layout algorithm as described above suffers from complications when applied to dynamic data. First, the calculation of lower level tessellations does not begin until after higher-level tessellations are finished. Second, generator positions can become invalid once bounding regions have been altered to reflect dynamic data. Both of these issues make animation problematic. Finally, the relatively long duration of the tessellation algorithm makes the animation of real-time dynamic data difficult.

As illustrated in FIGS. 4A through 4D, the top level tessellation must be allowed to fully converge before any lower-level tessellations are performed. The result is that tessellations are performed serially. Unfortunately, this makes animation impossible because only a fraction of the Treemap's layout is determined until the layout algorithm reaches the final subdivision step. Drawing the visualization prior to this point would result in a Treemap with missing regions. Moreover, because the top-level Voronoi regions are altered when data values change, lower-level generators used to compute the Voronoi regions prior to the data change may become invalid. Their positions, valid prior to the data change, may suddenly become located outside of the newly updated top-level Voronoi regions once the higher-level tessellation is performed. Choosing new generators, however, can result in wildly different layouts that prevent effective animation.

Finally, the VT layout algorithm can take a long time to converge. Several seconds are often required for relatively simple data structures, and examples from the original paper take many minutes to complete. This is especially problematic given that complete tessellations are not generated during intermediate periods. As a result, animated VTs for dynamic data are not supported. Moreover, even if interpolation could be applied in place of intermediate tessellations, the long duration required to determine a final stable layout makes real-time animation impossible.

Dynamic Voronoi Treemaps

As previously indicated, the disclosed DVTs can visualize dynamic data in real-time using smoothly animated Voronoi-based Treemap layouts. This section first describes the basic DVT algorithm. It then addresses a number of additional design considerations.

Basic DVT Algorithm

The DVT algorithm has two distinct phases. First, there is an initialization phase (FIG. 5) which is performed once to bootstrap the visualization regardless of how many times the data being visualized changes. After the initialization phase, an iterative update phase (FIG. 6) is performed continuously throughout the lifetime of the visualization to drive animated transitions when data changes.

1. DVT Initialization Phase

Figure 5:
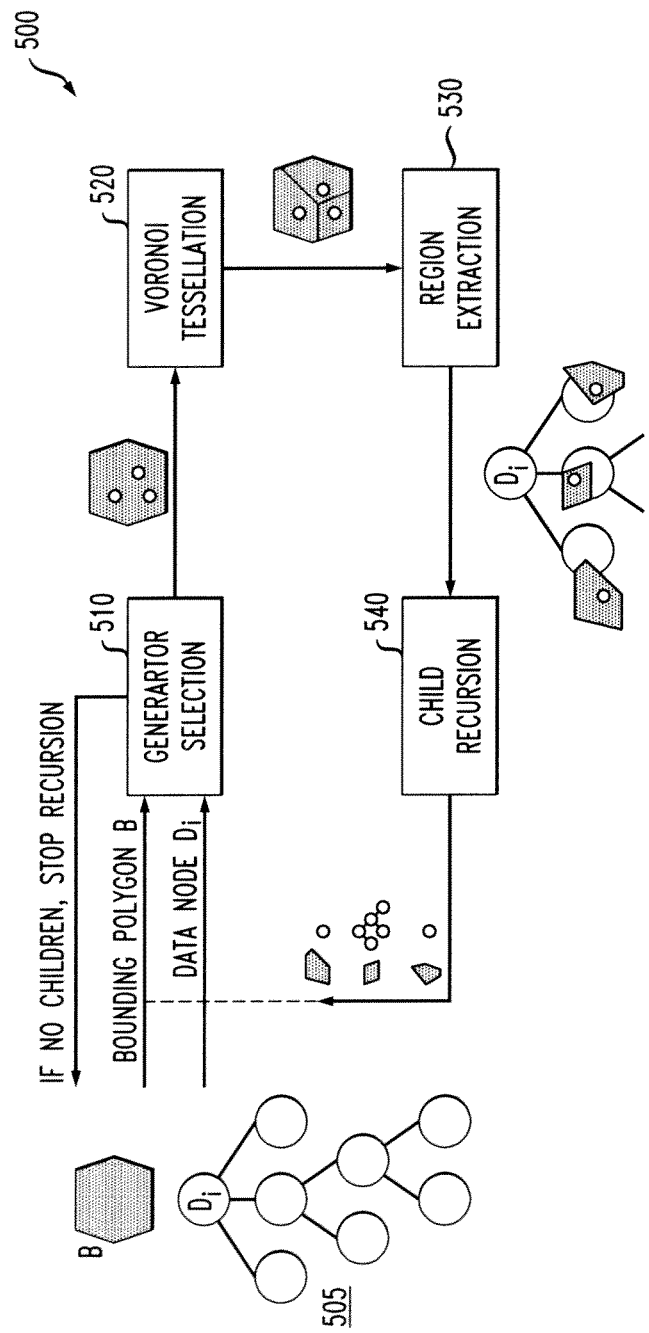
FIG. 5 is a flow chart describing an exemplary implementation of the initialization phase of a DVT algorithm.

FIG. 5 is a flow chart describing an exemplary implementation of the initialization phase 500. The initialization phase 500 is responsible for generating the first complete multi-level Voronoi tessellation of the visualization space when a visualization is first constructed. The purpose of this phase 500 is to bootstrap the iterative update procedure with a valid initial state. It therefore does not produce a CVT. Instead, the initial tessellation produced here will be optimized during the subsequent iterative update phase.

The initialization phase 500 is a recursive procedure as shown in FIG. 5. The algorithm 500 recursively traverses the hierarchical data set 505 starting from the root. At each recursive step, a bounding region $B_i$ and a node $D_i$ in the data hierarchy 505 are passed in as input. The process begins with $B_i$ equal to the overall visualization's bounding box B and $D_i$ set to the root of the hierarchical data set 505 being visualized. At each recursive step, generators are created by choosing a random point $g_i$ within the bounding region $B_i$ for each child of $D_i$. The generators are assigned an initial weight $w_i$. The value for this weight is not critical as it will be modified during the iterative update phase. However, each $W_i$ is initialized to its corresponding data value.

After the generators are selected during step 510, an AWP Voronoi tessellation is computed during step 520. Note that a centroidal tessellation is not computed at this stage. Therefore, the iterative Lloyd's method is not required. Each region produced by the tessellation procedure is mapped to its corresponding sub-tree in the data set during the region extraction step 530. The algorithm is then recursively applied during step 540 to these new regions and data sub-trees until the entire hierarchy has been traversed. Each node $D_i$ is stored with its corresponding Voronoi region and the generator used to produce it.

This phase is extremely fast as no iterative optimization is performed during the tessellation step. For this reason, the sizes of the Voronoi regions produced in this phase do not yet correspond to the initial values of the data set. In addition, the regions are likely to have poor aspect ratios. Optimization of these properties is accomplished during the iterative update phase.

2. DVT Iterative Update Phase

Figure 6:
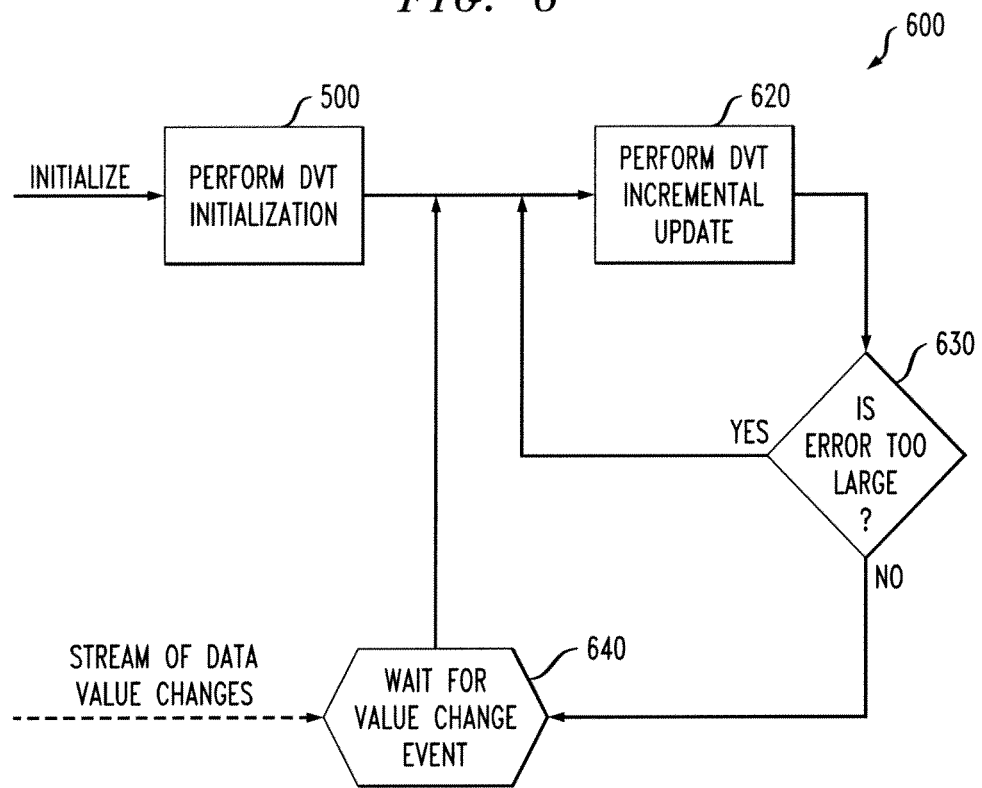
FIG. 6 is a flow chart describing an exemplary implementation of the iterative update phase of a DVT algorithm.

FIG. 6 is a flow chart describing an exemplary implementation of the iterative update phase 600. After the initialization phase 500 (FIG. 5) completes, the DVT algorithm enters the iterative update stage 600, shown in FIG. 6. During this phase 600 of the algorithm, the multilevel tessellation produced during initialization is iteratively improved to optimize both region size (to better correspond to possibly changing data values) and centroid location (to obtain desirable aspect ratios). Each iterative step typically produces a complete hierarchical Voronoi tessellation that is suitable for animation.

High-Level Iterative Process

The high-level flow of the DVT iterative update algorithm 600 is illustrated in FIG. 6. The hierarchical Voronoi tessellation produced during the initialization phase 500 is passed to an incremental update module 620 that performs a single optimization step over all levels of the Voronoi tessellation. Described in more detail below, this step (1) recursively evaluates and improves the aspect ratio and size of each Voronoi region in the tessellation, and (2) produces an overall error measure for the updated tessellation. The incremental update step produces a complete multi-level Voronoi tessellation for each iteration, enabling animated rendering. This overcomes the challenge described above, in the section entitled "Complications for Dynamic Data."

The iterative update process 600 is repeated until the error measure is reduced below a predefined threshold, as determined during step 630. Absent any changes to the underlying data set being visualized, the algorithm 600 converges to a stable centroidal Voronoi-based Treemap layout. After convergence, any changes to underlying data values will trigger a new round of iterative updates during step 640. Data changes can also occur prior to convergence. In this case, the new values become active immediately during the incremental update step. For clarity, the discussion in this section addresses only changes to data values for existing elements already in the data hierarchy. The addition or removal of data elements themselves is discussed below.

Incremental Update Routine

Figure 7:
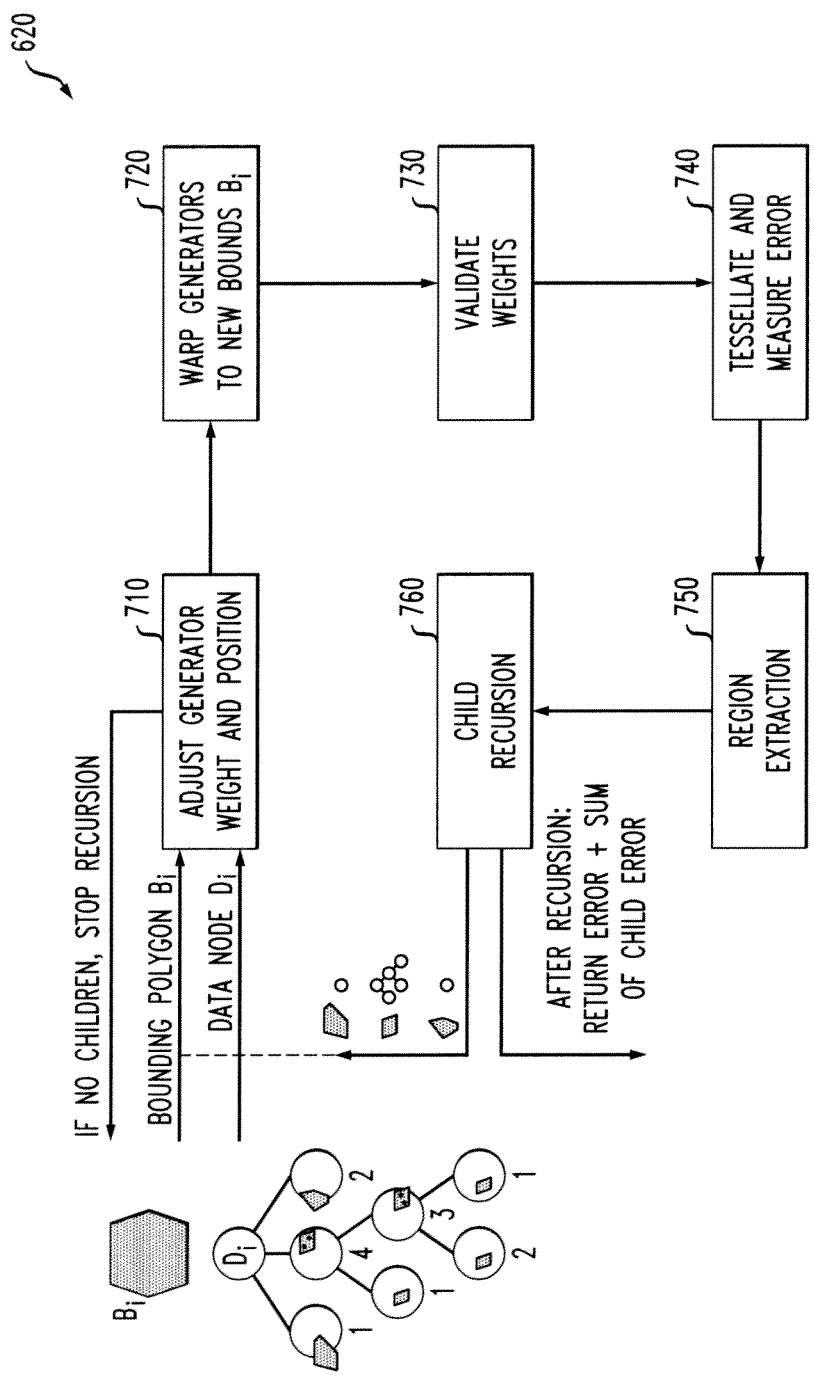
FIG. 7 is a flow chart illustrating an exemplary implementation of the incremental update algorithm of FIG. 6.

The most critical stage of the DVT update phase 600 is the incremental update routine 620, shown in greater detail in FIG. 7. This step recursively traverses an existing hierarchical Voronoi tessellation, modifies generator positions and weights to improve the layout, and regenerates a new multi-level tessellation. A warping step is introduced to this process to overcome the problem of invalidated generators created by changing bounding regions.

FIG. 7 is a flow chart illustrating an exemplary implementation of the incremental update algorithm 620. The incremental update algorithm 620 is a recursive algorithm that takes as input two pieces of data: (1) a data element $D_i$ which is the root of a sub-tree in the hierarchical data set, and (2) a bounding polygon $B_i$ within which the Voronoi tessellation for $D_i$ must be embedded. As output, the algorithm produces an improved hierarchical tessellation for $D_i$ and its children together with an overall error measure indicating the quality of the visualization layout. The process begins during step 710 by examining the generators and Voronoi regions associated with each child of D. Each of $D_i$'s children $D_j$ has associated with it both a generator $g_j$ and a Voronoi region r. These values represent the Voronoi tessellation produced during the prior iteration (or during initialization when this stage is called for the first time). To improve region aspect ratio, the center of mass is determined for each $r_j$ and the corresponding generator $g_j$ is relocated to the center of mass. In addition, the area for each $r_j$ is computed and compared to the area of the bounding region $B_i$. If the area is too small, given the data value associated with $D_j$, the weight assigned to $g_j$ is increased. If the area is too large, the weight is decreased. As in the original VT algorithm, negative weights are allowed to ensure convergence when optimizing for region size.

Figure 8A:
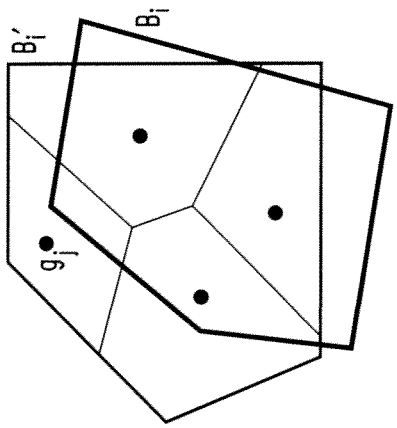
FIG. 8 illustrates a warping technique implemented by the incremental update algorithm of FIG. 7.

Next, a unique warping step is performed during step 720. As mentioned above, the adjustment of generators $g_j$ is performed using Voronoi regions $r_j$ produced during the prior iteration (or initialization). They are therefore positioned within the prior iteration's bounding region $B'_i$. However, bounding regions can change between iterations as the layout is optimized. This can lead to significant differences between the $B'_i$ and the current iteration's bounding region $B_i$. Unfortunately, changes in bounding region can invalidate generator positions (if they fall outside of $B_i$) or place them far away from their ideal positions. For example, FIG. 8A shows one invalid generator which falls outside of $B_i$. The other three generators remain valid, but are positioned in less desirable locations within $B_i$. The warping step is introduced at step 720 to substantially guarantee (1) that all generators remain valid even for dramatic changes in bounding region, and (2) that generator positions are translated to better reflect changes to bounding region.

Figure 8B:
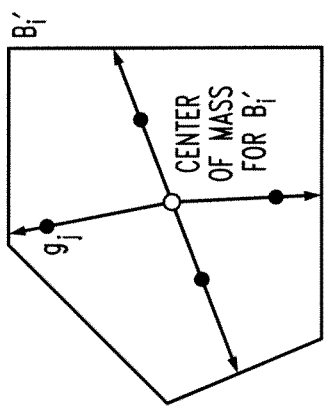
Figure 8C:
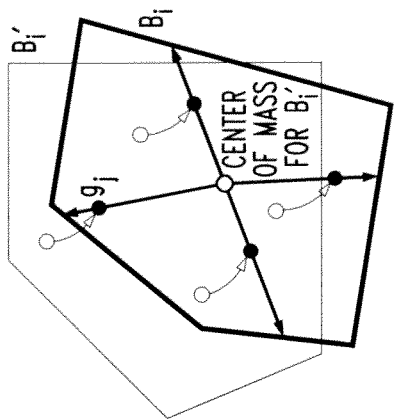

The warping technique is illustrated in FIGS. 8B-8C. First, the center of mass is calculated for $B'_i$. Then rays are cast from the center of mass through each generator $g_j$ to the edge of $B'_i$. For each ray, both the ray orientation and the position of the generator are calculated relative to the magnitude of the ray. To determine the new corresponding position of each generator within $B_i$, the center of mass of $B_i$ is first calculated. Then, using the ray orientations from $B'_i$ and $B_i$'s center of mass, new rays are extended to the edges of $B_i$. Finally, generators are positioned along these rays at the relative positions calculated using the old bounding region.

After the warping stage 720 has completed, the weights assigned to each generator are validated during step 730. During warping, it is possible that a high weight generator $g_h$ (with weight $w_h$) is positioned too close to a low weight generator $g_l$ (with weight $w_l$). In this case, the AWP distance (Equation 2) between the two generators $g_h$ and $g_l$ may be less than the AWP distance between $g_l$ and itself. Mathematically, this occurs when the following inequality is violated:

$$\|g_h-g_l\|^2 > w_h - w_l \quad (3)$$

If a violation of Equation 3 is detected, the weight $w_h$ is reduced so that $w_h = \|g_h - g_l\|^2 + w_l + \epsilon$, where $\epsilon$ is a very small positive value.

After weight validation, a Voronoi tessellation of $B_i$ is performed during step 740 using the set off adjusted, warped, and validated generators. This produces a new tessellation for the children of $D_i$ which is an incremental improvement from the prior iteration.

Following tessellation, a layout error measure for the newly constructed Voronoi regions is computed during step 740. The measure is calculated by summing the error associated with each individual region. For each region, the layout error is defined as a linear combination of size error and aspect ratio error. Size error measures how closely the size of a Voronoi region reflects the data value it represents, with a value of zero representing a region that is exactly the right size. Aspect ratio error is measured using the distance between a generator and the center of is located exactly at the center of mass has an aspect ratio value of zero.

Next, the region extraction step 750 maps each new Voronoi region and its associated generator to the corresponding sub-tree in the data set. The algorithm 620 then recurses during step 760 to each of the children of D, using the new Voronoi regions as bounding regions for the recursive tessellations.

Finally, the algorithm concludes by returning a sum of the layout error returned by each of the recursive calls added to its own measurement of layout error. The total overall layout error after the entire recursive process returns is used to determine if additional iterations are required to further improve the tessellation.

Additional Considerations

According to one aspect of the invention, a new region is inserted into a multi-level tessellation having a plurality of existing regions by adjusting one or more of a size and location of at least one of the existing regions. In one exemplary implementation, a unique known location is used for each set of siblings. The first time a new region is inserted into any set of siblings, a known location is "initialized" for this set of siblings. The initialized location could be selected at random, or chosen using a heuristic, such as "top left-most vertex." When the known location becomes invalid (e.g., the vertex disappears from the tessellation, or otherwise violates some criteria such as "top left-most") a new initialization can be performed to select a new known location for the set of siblings.

Generally, when a new region is inserted into the treemap, the existing regions are deformed to make space for the new region. One aspect of the invention preserves the stability of an existing tessellation by inserting a new region into the existing tessellation by adjusting the size and/or position of one or more existing regions. For example, the size and/or position of one or more existing regions can be adjusted by repositioning the corresponding generators, $G_i$, as discussed above. Typically, the changes to size and/or position of the existing regions are substantially minimal to preserve the stability.

The basic DVT algorithm described above enables animated Voronoi based Treemaps for data sets with changing values.

1. Removal and Insertion

The core DVT algorithm describes how to visualize data elements with changing values. However, there may also be data elements that are completely removed or added to the data set over time.

Animating the removal of a region from a DVT is straight forward. By setting the value of a data element to zero, the default algorithm will iteratively reduce the area assigned to the corresponding Voronoi region until it reaches zero and disappears. This produces an animated disappearance of a zero-valued region. Once the region has disappeared, the corresponding data element can be safely removed from the data structure.

Animating the insertion of a new data element is more complex. When a new data element is added to the data structure, it must be assigned an initial generator. This is required to allow the iterative update phase to proceed correctly.

The selection of generator position can follow one of two approaches: (1) randomized vertex selection, and (2) anchored vertex selection. Randomized vertex selection uses a random vertex from any peer Voronoi region in the data set as the generator's initial position, as discussed further below in conjunction with FIG. 10. This technique produces a random insertion pattern where new nodes are spread out spatially. As a result, the DVT converges fairly quickly to a new layout even when several data elements are added at once. However, the spatial distribution of new regions makes it harder for users to recognize when new data elements appear.

Anchored vertex selection uses the same vertex for the insertion of all new nodes added to the same tier of the hierarchical data set, as discussed further below in conjunction with FIG. 11. This approach has the benefit that all new regions first appear at the same place, producing a clear "flow" of new nodes into the visualization. However, because all new regions are inserted at the same location, they have further to travel before reaching a low-error layout. As a result, it takes longer to converge than the randomized approach.

Choosing the best approach for inserting new nodes is application dependent. In one exemplary implementation, anchored vertex selection was employed because of the relatively slow pace of inserting new nodes and the importance of conveying the appearance of new nodes to the user.

After a generator position has been determined, a weight must be assigned. An initial weight is calculated using Equation 3, the same equation used for weight validation. The new generator's position is compared with the position of its peers. The lowest possible weight is computed such that Equation 3 is satisfied. This initial weight is increased during the iterative update phase until the corresponding Voronoi region reaches the desired size.

FIG. 9 is a flow chart describing an exemplary alternate implementation of a DVT algorithm 900 having an insertion of one or more nodes. Generally, the algorithm 900 is based on the incremental update algorithm 620 of FIG. 7, with the addition of a number of steps to attend to the node insertion. Again, the incremental update algorithm 900 is a recursive algorithm that takes as input two pieces of data: (1) a data element $D_i$ which is the root of a sub-tree in the hierarchical data set, and (2) a bounding polygon $B_i$ within which the Voronoi tessellation for $D_i$ must be embedded. As output, the algorithm 900 produces an improved hierarchical tessellation for $D_i$ and its children together with an overall error measure indicating the quality of the visualization layout. The process begins during step 910 by determining if there are any child nodes to process. If there are children to process, the algorithm measures the error, and adjusts the weight and center of mass of the child site during step 920 (in a similar manner to step 710, above). Next, a warping step is performed during step 930.

After the warping stage 930 has completed, the new children at the current level are identified during step 940. A test is then performed during step 950 to determine if there are any additional new children to process. If it is determined during step 950 that there is a new child, then a new node is inserted during step 960 (as discussed further below in conjunction with FIGS. 10 and 11). If, however, it is determined during step 950 that there is not a new child, then program control proceeds to step 970.

The weights assigned to each generator are validated during step 970, as discussed above for step 730. After weight validation, a Voronoi tessellation of $B_i$ is performed during step 980 using the set off adjusted, warped, and validated generators. This produces a new tessellation for the children of $D_i$ which is an incremental improvement from the prior iteration. In addition, a layout error measure for the newly constructed Voronoi regions is also computed. As discussed above, the measure is calculated by summing the error associated with each individual region.

Next, the region extraction step 990 maps each new Voronoi region and its associated generator to the corresponding sub-tree in the data set. The algorithm 900 then recurses during step 995 to each of the children of $D_i$ using the new Voronoi regions as bounding regions for the recursive tessellations.

Finally, the algorithm 900 concludes by returning a sum of the layout error returned by each of the recursive calls added to its own measurement of layout error. The total overall layout error after the entire recursive process returns is used to determine if additional iterations are required to further improve the tessellation.

Figure 10:
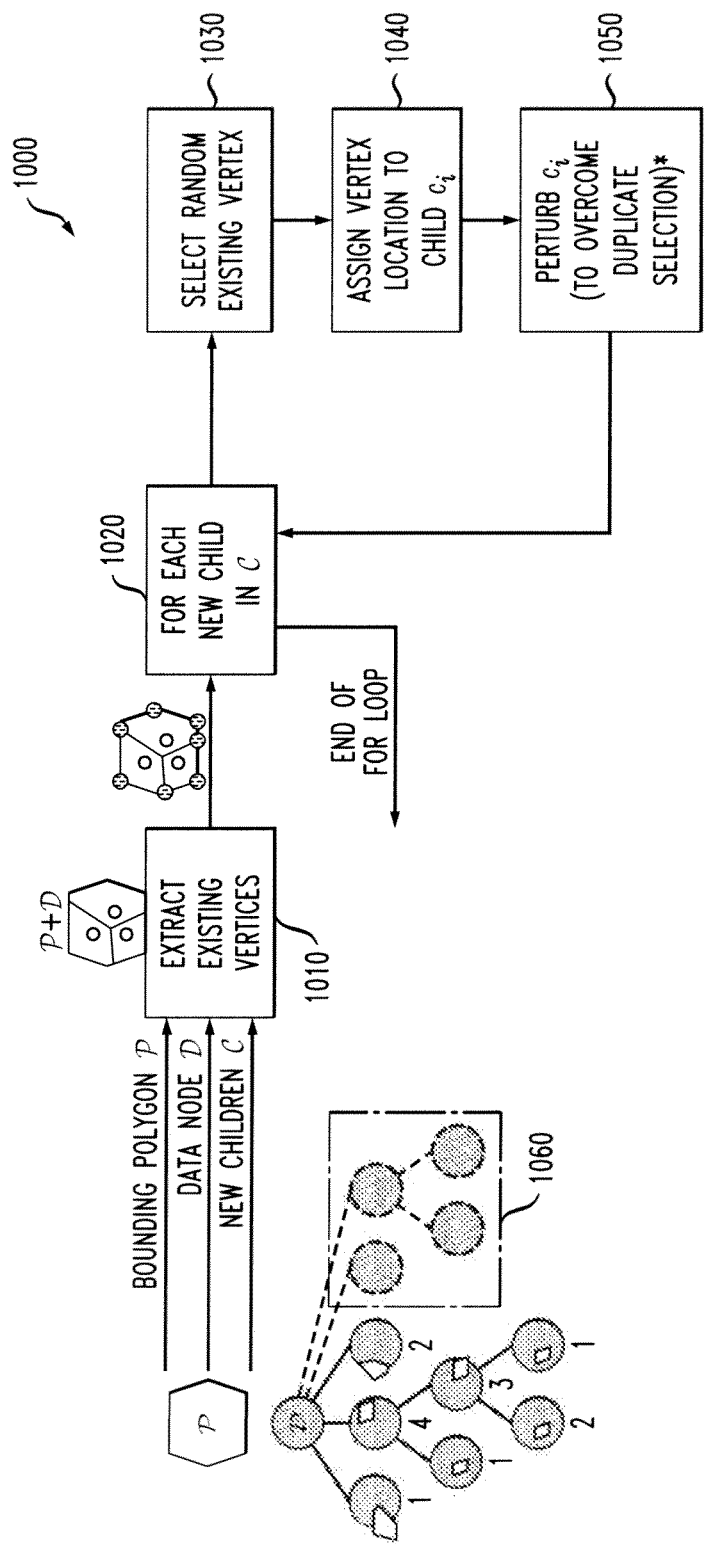
FIG. 10 is a flow chart describing an exemplary implementation of the node insertion step of FIG. 9, using randomized vertex insertion.

FIG. 10 is a flow chart describing an exemplary implementation of the node insertion step 960 of FIG. 9, using randomized vertex insertion. As noted above, the process 1000 generally demonstrates good convergence properties. As shown in FIG. 10, the randomized vertex insertion process 1000 initially extracts existing vertices from the treemap during step 1010. Thereafter, for each new child in C (step 1020), the process 1000 performs the following steps. The new children are shown as 1060 in the treemap of FIG. 10.

The process 1000 selects a random existing vertex during step 1030 and assigns the vertex location to child $c_i$ during step 1040. The child $c_i$ is perturbed during step 1050, to overcome duplicate selection (e.g., to ensure two points are not on top of each other).

Figure 11:
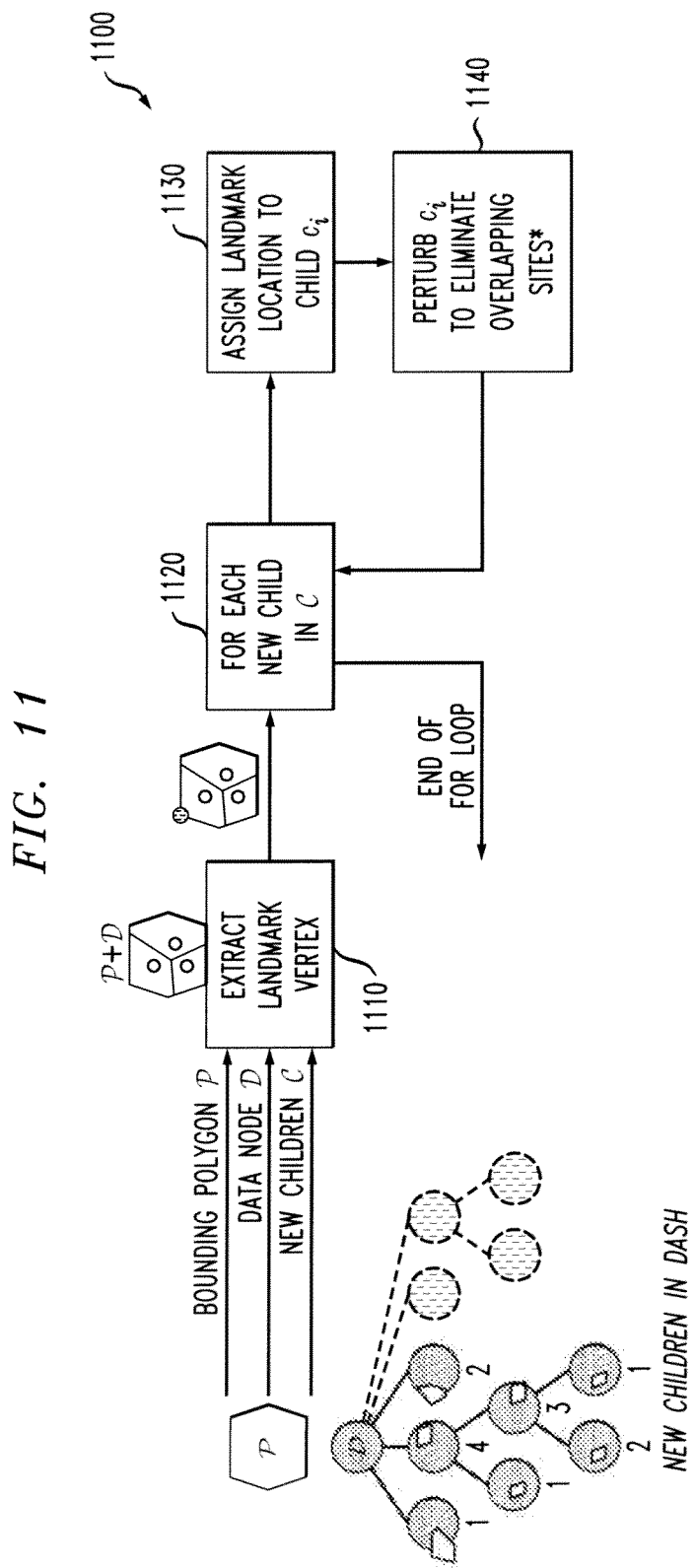
FIG. 11 is a flow chart describing an exemplary alternate implementation of the node insertion step of FIG. 9, using static vertex insertion.

FIG. 11 is a flow chart describing an exemplary alternate implementation of the node insertion step 960 of FIG. 9, using static vertex insertion. As noted above, the process 1100 generally conveys a visual flow to the user, as a new node always enters from the same location. As shown in FIG. 11, the static vertex insertion process 1100 initially extracts an existing landmark vertex from the treemap during step 1110. Thereafter, for each new child in C (step 1120), the process 1100 performs the following steps. The process 1100 assigns a landmark location to child $c_i$ during step 1130. The child $c_i$ is then perturbed during step 1140, to eliminate overlapping sites.

2. Animation Throttling

The speed at which Voronoi regions move during animation can be highly variable. This is an artifact of the optimization algorithm which uses a greedy metric to improve the shape and size of each region independently. As a result, regions often "push" against each other for screen space. In some cases, the movement of regions can become very slow as the optimization approaches a local equilibrium, then speed up quickly as the system "squeezes" past stable point on its way to the final optimized layout. This behavior is analogous to the geological concept of two tectonic plates rubbing against each other until the energy is so great that there is an earthquake.

These squeeze events are apparent during animation of a DVT as suddenly fast movements which can distract from a user's ability to follow the motion of a region. To limit the visual impact of such events, the distance by which the centroid of any region can move in a single time step is restricted to a maximum threshold. This approach throttles the top speed at which a region can move during animation, making it easier for users to follow.

3. Landmarking

In the basic DVT algorithm, Voronoi regions can move freely around their corresponding bounding region during animation. As a result, a region that starts on the left side of the visualization can migrate over time to the right side of the display. However, there are times where it may be more desirable to keep an important region located at the same place within the visualization.

This can be accomplished by landmarking. A landmarking technique fixes the position of a landmarked region's generator to a static location within its bounding region. As a result, the landmarked region does not move during animation. Landmarking can be used to fix the location of one region or multiple regions. However, the use of too many landmarks can restrict layout flexibility and result in sub-optimal tessellations that take a longer time to converge. Thus, landmarking allows a new region to be inserted from a known location, so that a user can observe the known location to identify newly inserted regions.

4. Highlighting

Animation is a useful technique for visualizing the dynamic nature of a data set. However, observations have shown that it can be difficult at times to distinguish between regions undergoing small value changes and regions that are simply changing spatial positions with maintaining the same value. Highlighting can be used to mark regions with changing values to help users overcome this challenge. One exemplary implementation employs an optional time-decaying highlight around the border of any region that undergoes a change in value. The highlight appears with full intensity when a value change first occurs and fades over time.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
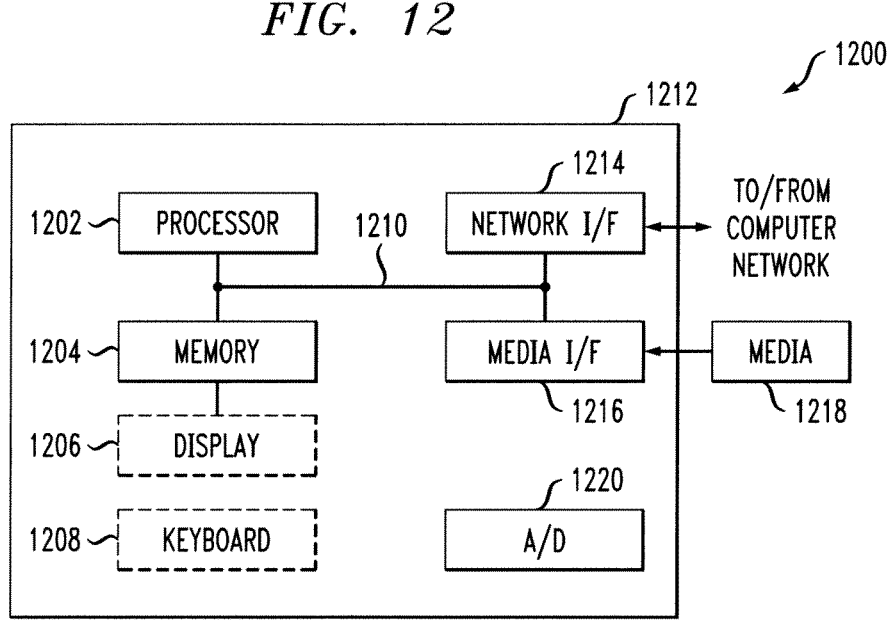
FIG. 12 depicts a computer system that may be useful in implementing one or more aspects and/or elements of the present invention.

One or more embodiments can make use of software running on a general purpose computer or workstation. FIG. 12 depicts a computer system 1200 that may be useful in implementing one or more aspects and/or elements of the present invention. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Analog-to-digital converter(s) 1220 may be provided to receive analog input, such as analog video feed, and to digitize same. Such converter(s) may be interconnected with system bus 1210.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1202. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for processing a treemap, comprising:
   obtaining a multi-level tessellation having a plurality of existing regions;
   inserting at least one new region into the multi-level tessellation by adjusting one or more of a size and location of at least one of the existing regions, wherein a vertex of the multi-level tessellation is randomly selected as an insertion point from a set of vertices that define regions that are siblings to the newly inserted region; and
   iteratively processing the multi-level tessellation to update one or more of a region size and a centroid location of a plurality of the regions, where the multi-level tessellation is processed over substantially all levels to produce a substantially complete multi-level tessellation for each iteration, wherein said substantially complete multi-level tessellation comprises a plurality of hierarchical tessellations, wherein at least one of said steps is performed by at least one hardware device.

2. The method of claim 1, wherein the inserting step preserves a stability of the treemap.

3. The method of claim 1, wherein a new generator is placed at the insertion point.

4. The method of claim 1, wherein the selected vertex is a known location.

5. The method of claim 4, wherein the known location is initialized using a function over a set of vertices that define regions that represent a set of siblings in a hierarchical data structure.

6. The method of claim 4, wherein the known location is used for subsequent insertions until the known location vertex is invalidated.

7. The method of claim 1, wherein the insertion step further comprises the step of assigning a weight to a new Voronoi generator.

8. The method of claim 7, wherein the weight is chosen initially to be a nominal weight according to one or more constraints of the tessellation.

9. The method of claim 1, further comprising the step of removing at least one region from the multi-level tessellation.

10. The method of claim 1, wherein the step of iteratively processing the multi-level tessellation further comprises the step of warping one or more generators of a tessellation of a prior step to fit into a bound polygon of a current step.

11. The method of claim 10, wherein an insertion or removal of a region during a given iteration is performed after the warping step.

12. The method of claim 1, wherein the region size is updated to correspond to one or more changing data values.

13. The method of claim 1, wherein the centroid location is updated to improve an aspect ratio.

14. The method of claim 1, wherein the treemap comprises a Voronoi treemap.

15. An apparatus for processing a treemap, the apparatus comprising:
- a memory; and
- at least one processor, coupled to the memory, operative to:
    - obtain a multi-level tessellation having a plurality of existing regions;
    - insert at least one new region into the multi-level tessellation by adjusting one or more of a size and location of at least one of the existing regions, wherein a vertex of the multi-level tessellation is randomly selected as an insertion point from a set of vertices that define regions that are siblings to the newly inserted region; and
    - iteratively process the multi-level tessellation to update one or more of a region size and a centroid location of a plurality of the regions, where the multi-level tessellation is processed over substantially all levels to produce a substantially complete multi-level tessellation for each iteration, wherein said substantially complete multi-level tessellation comprises a plurality of hierarchical tessellations.

16. An article of manufacture for processing a treemap, comprising a tangible non-transitory machine readable recordable storage medium containing one or more programs which when executed implement the steps of:
- obtaining a multi-level tessellation having a plurality of existing regions;
- inserting at least one new region into the multi-level tessellation by adjusting one or more of a size and location of at least one of the existing regions wherein a vertex of the multi-level tessellation is randomly selected as an insertion point from a set of vertices that define regions that are siblings to the newly inserted region; and
- iteratively processing the multi-level tessellation to update one or more of a region size and a centroid location of a plurality of the regions, where the multi-level tessellation is processed over substantially all levels to produce a substantially complete multi-level tessellation for each iteration, wherein said substantially complete multi-level tessellation comprises a plurality of hierarchical tessellations.

17. The article of manufacture of claim 16, wherein the inserting step preserves a stability of the treemap.

18. The article of manufacture of claim 16, wherein a new generator is placed at the insertion point.

19. The article of manufacture of claim 16, wherein the selected vertex is a known location.

20. The article of manufacture of claim 19, wherein the known location is initialized using a function over a set of vertices that define regions that represent a set of siblings in a hierarchical data structure.

* * * * *